United States Patent
Takabayashi et al.

(10) Patent No.: US 7,389,711 B2
(45) Date of Patent: Jun. 24, 2008

(54) GEAR HOUSING OF DRIVING DEVICE EQUIPPED WITH MOTOR

(75) Inventors: Hiroyoshi Takabayashi, Hamakita (JP); Takashi Tsuda, Toyohashi (JP); Yoshinobu Hirano, Toyohashi (JP); Nobuyasu Niibayashi, Hamamatsu (JP); Tooru Inayoshi, Kosai (JP); Hidenori Iimi, Kariya (JP)

(73) Assignees: Asmo Co., Ltd., Shizuoka-Ken (JP); Denso Corporation, Aichi-Ken (JP)

( * ) Notice: Subject to any disclaimer, the term of this patent is extended or adjusted under 35 U.S.C. 154(b) by 897 days.

(21) Appl. No.: 10/921,586

(22) Filed: Aug. 19, 2004

(65) Prior Publication Data

US 2005/0039571 A1    Feb. 24, 2005

(30) Foreign Application Priority Data

Aug. 21, 2003    (JP)    ............................. 2003-297425

(51) Int. Cl.
F16H 57/02    (2006.01)
(52) U.S. Cl. .................................... 74/606 R
(58) Field of Classification Search ................ 74/606 R
See application file for complete search history.

(56) References Cited

U.S. PATENT DOCUMENTS

| | | | | |
|---|---|---|---|---|
| 5,123,298 A | * | 6/1992 | Taguchi | 74/606 R |
| 6,014,915 A | * | 1/2000 | Evans | 74/606 R |
| 6,122,995 A | * | 9/2000 | Gievers et al. | 74/606 R |
| 6,729,206 B2 | * | 5/2004 | Hayabuchi et al. | 74/606 R |
| 6,938,517 B2 | * | 9/2005 | Cook et al. | 74/606 R |

FOREIGN PATENT DOCUMENTS

| | | |
|---|---|---|
| JP | 11-082528 | 3/1999 |
| JP | 2001-103705 | 4/2001 |

* cited by examiner

Primary Examiner—Chong H Kim
(74) Attorney, Agent, or Firm—Fay Kaplun & Marcin LLP

(57) ABSTRACT

A driving device includes a motor, and a gear housing secured to the motor. The gear housing accommodates reduction gears. Rotation of the motor is reduced by the reduction gears before being transmitted to an output shaft supported by the gear housing. A support cylinder extends from an outer surface of the gear housing to support the output shaft. A surrounding cylinder extends from the outer surface of the gear housing to surround the support cylinder. Reinforcing ribs are located between the support cylinder and the surrounding cylinder. Each reinforcing rib extends from a circumferential wall of the support cylinder such that the angle between the reinforcing rib and a normal line that intersects the circumferential wall form a predetermined angle. Each reinforcing rib has a radially inward end connected to the support cylinder and a radially outward end connected to the surrounding cylinder.

14 Claims, 2 Drawing Sheets

GEAR HOUSING OF DRIVING DEVICE EQUIPPED WITH MOTOR

BACKGROUND OF THE INVENTION

The present invention relates to a gear housing of a driving device equipped with a motor.

Japanese Laid-Open Patent Publication No. 2001-103705 discloses a driving device used in a vehicle wiper device or the like. The driving device includes a motor, which has a rotary shaft, and a reduction section, which reduces rotation of the rotary shaft before outputting the rotational force. The reduction section includes a gear housing, which is secured to a motor, a reduction gear, which is accommodated in the gear housing, and an output shaft, which projects outside the gear housing. The reduction gear includes a worm, which is secured to the rotary shaft, and a worm wheel, which meshes with the worm. The output shaft is coupled to the worm wheel. The gear housing has a support cylinder, which supports the output shaft to prevent the axis of the output shaft from tilting. The gear housing also has reinforcing ribs, which radially extend from the outer circumference of the support cylinder. The reinforcing ribs improve the strength of the support cylinder and prevent the output shaft from being tilted by a load applied from the outside.

The gear housing is formed by casting. During casting, the gear housing contracts as it is solidified and cooled. At this time, the reinforcing ribs, which extend radially, cause a relatively large tension to act on the support cylinder along the radial direction. This decreases the circularity of the inner circumference of the support cylinder by a large amount. When the circularity of the inner circumference of the support cylinder is low, the axis of a sliding bearing, which is secured to the inner circumference of the support cylinder, may be tilted by an intolerable degree or lubricant oil between the sliding bearing and the output shaft may leak. Therefore, the support cylinder need to go through a cutting process or a sizing process after casting the gear housing in order to increase the circularity of the inner circumference of the support cylinder.

SUMMARY OF THE INVENTION

Accordingly, it is an objective of the present invention to provide a gear housing of a driving device equipped with a motor that permits the circularity of the inner circumference of the support cylinder to be easily improved.

To achieve the above objective, the present invention provides a gear housing of a driving device equipped with a motor. The gear housing is secured to the motor and accommodates reduction gears. Rotation of the motor is reduced by the reduction gears and transmitted to an output shaft supported by the gear housing. The gear housing includes a support cylinder, which supports the output shaft, and a plurality of reinforcing ribs located about the support cylinder. Each reinforcing rib extends from a circumferential wall of the support cylinder such that the angle between the reinforcing rib and a normal line that intersects the circumferential wall of the support cylinder form a predetermined angle. Each reinforcing rib is connected to the adjacent reinforcing rib at the circumferential wall of the support cylinder.

The present invention also provides a driving device. The driving device includes a motor, a gear housing secured to the motor, a plurality of reduction gears accommodated in the gear housing, and an output shaft supported by the gear housing. Rotation of the motor is reduced by the reduction gears before being transmitted to the output shaft. The driving device further includes a support cylinder, which extends from an outer surface of the gear housing to support the output shaft, and a plurality of reinforcing ribs, which extend from the outer surface of the gear housing about the support cylinder. Each reinforcing rib extends from a circumferential wall of the support cylinder such that the angle between the reinforcing rib and a normal line that intersects the circumferential wall of the support cylinder form a predetermined angle. Each reinforcing rib is connected to the adjacent reinforcing rib at the circumferential wall of the support cylinder.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
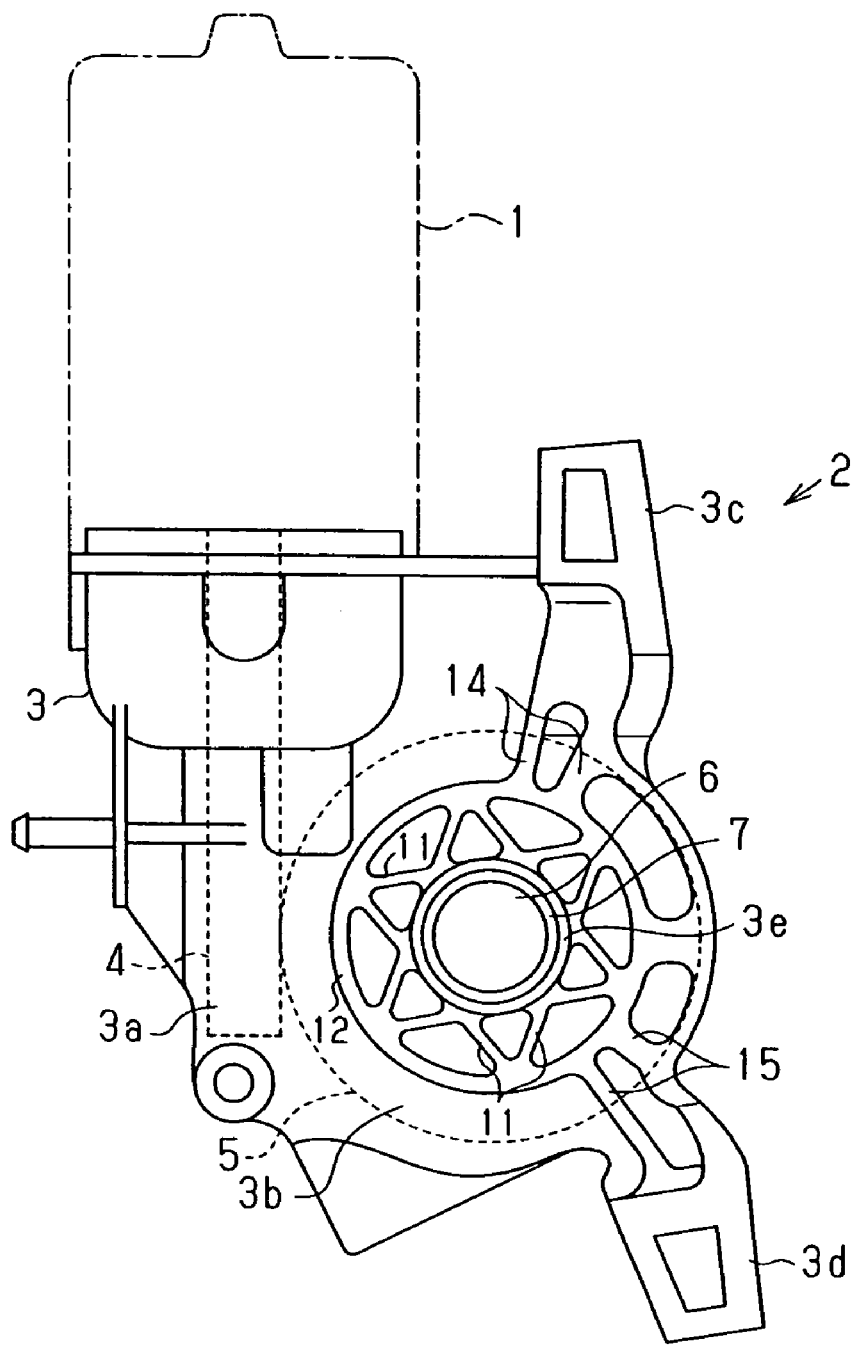
FIG. 1 is a front view illustrating a motor according to one embodiment of the present invention.

One embodiment of the present invention will now be described with reference to FIGS. 1 to 3. As shown in FIG. 1, a driving device includes a motor 1 (shown by a dashed line in FIG. 1) and a reduction section 2, which is coupled to the motor 1. Although not shown in the drawings, the motor 1 includes a cylindrical yoke, magnets, which are secured to the inner circumferential surface of the yoke, and a rotor, which is accommodated in the yoke. The rotor includes a rotary shaft, which extends outside of the yoke. The reduction section 2 includes a gear housing 3, which is secured to the motor 1, a reduction gear, which is a worm 4 and a worm wheel 5 in this embodiment, and an output shaft 6.

The gear housing 3 is formed of aluminum alloy through casting. The gear housing 3 has a worm accommodating section 3a, which extends along the axis of the rotary shaft of the motor 1, and a wheel accommodating section 3b, which is adjacent to the worm accommodating section 3a. The gear housing 3 also has a pair of mounting portions 3c, 3d, which extend from portions of the wheel accommodating section 3b that are apart from the worm accommodating section 3a. The mounting portions 3c, 3d extend in the opposite directions that are substantially parallel to the rotary shaft. The mounting portions 3c, 3d are attached to predetermined support sections on a vehicle body or the like. The gear housing 3 has a support cylinder 3e (see FIG. 3), which is located at the center of the wheel accommodating section 3b and extends along a direction perpendicular to the rotary shaft (perpendicular to the surface of the sheet of FIG. 1) from the outer surface of the gear housing 3.

The worm 4 is accommodated in the worm accommodating section 3a and is coupled to the rotary shaft of the motor 1. The worm wheel 5 is accommodated in the wheel accommodating section 3b such that the worm wheel 5 is meshed with the worm 4. In this embodiment, the worm 4 is formed integrally with the rotary shaft. Thus, the worm 4 is accommodated in the worm accommodating section 3a at the same time as the gear housing 3 is assembled to the motor 1. The wheel accommodating section 3b is open to the rear side of the sheet of FIG. 1. The worm wheel 5 is accommodated in the wheel accommodating section 3b from the opening. The opening is closed by a closing member, which is not shown.

The output shaft 6 is coupled to the worm wheel 5 to rotate integrally with the worm wheel 5. The output shaft 6 is also rotatably supported by the support cylinder 3e. In this embodiment, the output shaft 6 is supported by a sliding bearing 7, which is secured to the inner circumferential surface of the support cylinder 3e. The output shaft 6 projects outside the gear housing 3 through the support cylinder 3e and is coupled to a driven member such as a wiper arm for a vehicle. Rotation of the motor 1 is reduced by the worm 4 and the worm wheel 5 before being transmitted to the output shaft 6.

Figure 2:
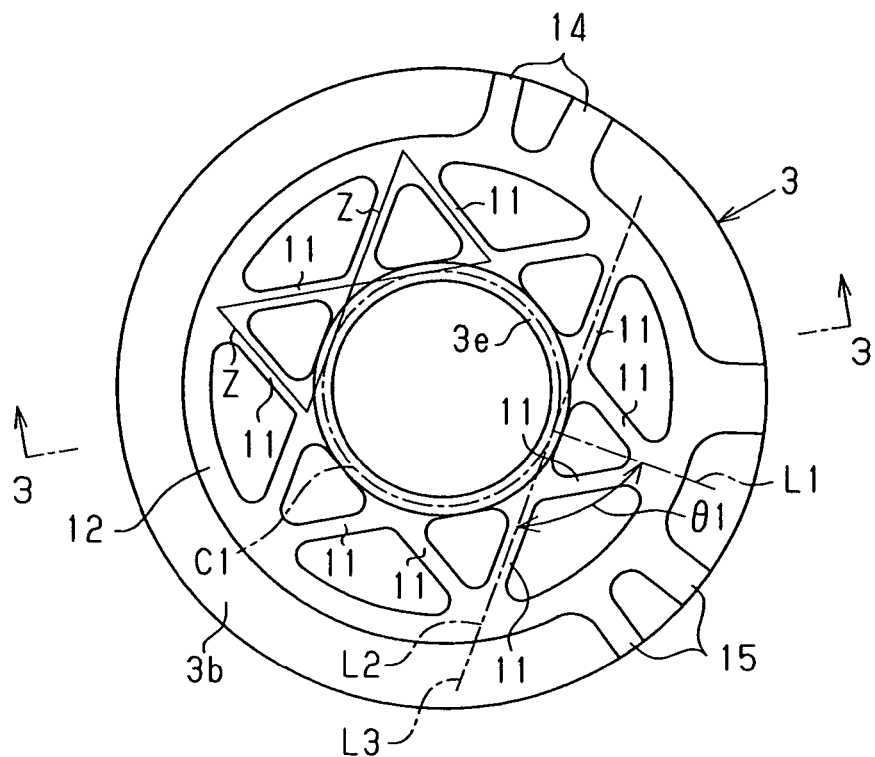
FIG. 2 is a partially enlarged view illustrating the gear housing of the motor shown in FIG. 1.

As shown in FIG. 2, the gear housing 3 has reinforcing ribs 11 about the support cylinder 3e. Each reinforcing rib 11 extends from the circumferential wall of the support cylinder 3e such that the angle between the reinforcing rib 11 and an imaginary normal line L1 that vertically intersects the circumferential wall of the support cylinder 3e is represented by a predetermined angle θ1. In other words, each reinforcing rib 11 extends from the circumferential wall of the support cylinder 3e such that the reinforcing rib 11 is tilted by the predetermined angle θ1 with respect to the radial direction. In the example shown in FIG. 2, the angle θ1 is set to approximately ninety degrees.

The gear housing 3 has a surrounding cylinder 12, which surrounds the support cylinder 3e and is coaxial with the support cylinder 3e. The reinforcing ribs 11 are located between the support cylinder 3e and the surrounding cylinder 12. Each reinforcing rib 11 has a radially inward end, which is connected to the outer circumferential surface of the support cylinder 3e, and a radially outward end, which is connected to the inner circumferential surface of the surrounding cylinder 12. As shown in FIG. 3, an annular groove 13 is formed on a portion of the inner surface of the wheel accommodating section 3b corresponding to the surrounding cylinder 12.

As shown in FIG. 2, in this embodiment, an imaginary straight line L2 that extends through the middle of the width (thickness) of each reinforcing rib 11 matches with a tangent line L3 to a circle C1 that extends through the middle of the width (thickness) of the support cylinder 3e. That is, each reinforcing rib 11 extends substantially along a tangent line to the support cylinder 3e.

The reinforcing ribs 11 are arranged to repeat a constant pattern along the circumferential direction of the support cylinder 3e. More specifically, as shown in FIG. 2, the radially inward end of each reinforcing rib 11 is connected to the adjacent reinforcing rib 11 and the radially outward end of each reinforcing rib 11 is connected to another adjacent reinforcing rib 11. As viewed from the axial direction of the support cylinder 3e, two reinforcing ribs 11, the radially outward ends of which are connected to each other, and a section of the support cylinder 3e between the two reinforcing ribs 11 form a triangle Z having a vertex on the surrounding cylinder 12. Such triangles Z are arranged along the circumferential direction of the support cylinder 3e. In this embodiment, twelve reinforcing ribs 11 are provided and six pairs of reinforcing ribs 11 form the triangles Z. The six pairs of reinforcing ribs 11, or the six triangles Z, are arranged at equal angular intervals of sixty degrees about the support cylinder 3e. The triangles Z are arranged to be symmetric with respect to the center of the support cylinder 3e.

The triangles Z are equilateral triangles or isosceles triangles each having a shape close to an equilateral triangle. The legs of each triangle Z are two of the reinforcing ribs 11 the radially outward ends of which are connected. The base of each triangle Z is a section of the support cylinder 3e between the corresponding reinforcing ribs 11. Each pair of the reinforcing ribs 11 that are connected to each other at radially inward ends and a section of the surrounding cylinder 12 between the reinforcing ribs 11 form a sectorial portion. The triangles Z and the sectorial portions are alternately arranged along the circumferential direction of the support cylinder 3e. Each triangle Z shares the vertexes at the ends of the base with the adjacent triangles Z. Joints of the reinforcing ribs 11, the support cylinder 3e, and the surrounding cylinder 12 provide smooth curves. On the extension of each reinforcing rib 11, that is, on the straight line L2 that extends through the middle of the width of the reinforcing rib 11, exist a section of the support cylinder 3e that forms the base of the adjacent triangle Z and one of the reinforcing ribs 11 that forms a leg of the triangle Z that is adjacent to the first triangle Z. The angle θ1 is set such that each triangle Z is an isosceles triangle. In the illustrated embodiment, the distance between the support cylinder 3e and the surrounding cylinder 12 in the radial direction and the angle θ1 are set such that the triangles Z are equilateral triangles or isosceles triangles each having a shape close to an equilateral triangle.

Figure 3:
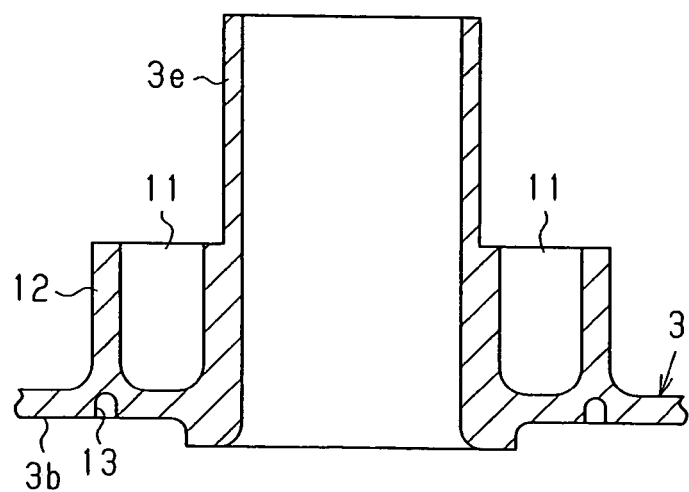
FIG. 3 is a cross-sectional view taken along line 3-3 of FIG. 2.

As shown in FIG. 3, the height (axial dimension) of the reinforcing ribs 11 and the surrounding cylinder 12 are substantially half the height of the support cylinder 3e.

As shown in FIGS. 1 and 2, the gear housing 3 has a pair of reinforcing ribs 14, which extend toward the mounting portion 3c, and a pair of reinforcing ribs 15, which extend toward the mounting portion 3d. The reinforcing ribs 14, 15 extend from the circumferential wall of the surrounding cylinder 12. The two reinforcing ribs 14 correspond to the mounting portion 3c and the two reinforcing ribs 15 correspond to the other mounting portion 3d.

The preferred embodiment provides the following advantages.

(1) The reinforcing ribs 11 arranged about the support cylinder 3e improve the strength of the support cylinder 3e and prevents the output shaft 6 supported by the support cylinder 3e from being tilted by a load applied from the outside. Each reinforcing rib 11 extends from the circumferential wall of the support cylinder 3e such that the angle between the reinforcing rib 11 and the normal line L1 that vertically intersects the circumferential wall of the support cylinder 3e is represented by the predetermined angle θ1. That is, each reinforcing rib 11 extends substantially along a tangent line to the support cylinder 3e. The reinforcing ribs 11 prevent tension from being applied to the support cylinder 3e along the radial direction when the gear housing 3 is solidified and cooled during casting. Therefore, deformation of the support cylinder 3e during casting is suppressed, which prevents the circularity of the inner circumference of the support cylinder 3e from being decreased. As a result, a cutting process or a sizing process of the support cylinder 3e after casting of the gear housing 3, can be eliminated or reduced.

(2) The gear housing 3 has the surrounding cylinder 12 about the support cylinder 3e. The radially outward end of each reinforcing rib 11 is connected to the surrounding cylinder 12. The surrounding cylinder 12 further improves the strength of the support cylinder 3e and permits the support cylinder 3e to support the output shaft 6 more stably.

(3) The annular groove 13 corresponding to the surrounding cylinder 12 is formed on the surface of the gear housing 3 opposite to the surrounding cylinder 12 (or on the inner surface of the wheel accommodating section 3*b*) as shown in FIG. 3. An annular projection corresponding to the annular groove 13 is formed in a mold for the gear housing 3 to form the annular groove 13 in the gear housing 3. The portion of the gear housing 3 surrounded by the annular projection, or in other words, the portion of the gear housing 3 surrounded by the surrounding cylinder 12, is less affected by contraction due to solidifying and cooling of the portion of the gear housing 3 about the surrounding cylinder 12 during casting of the gear housing 3. Therefore, the circularity of the inner circumference of the support cylinder 3*e* is improved. The annular groove 13 is formed at a portion of the gear housing 3 corresponding to the surrounding cylinder 12. Thus, although the annular groove 13 is formed, the thickness of the gear housing 3 is prevented from being partially thin. The loss of strength at the portion of the gear housing 3 corresponding to the annular groove 13 is compensated for by providing the surrounding cylinder 12. This prevents the strength of the gear housing 3 from being decreased due to the annular groove 13.

(4) The reinforcing ribs 11 are arranged to repeat a constant pattern along the circumferential direction of the support cylinder 3*e*. Therefore, when the gear housing 3 is solidified and cooled during casting, the tension applied to the support cylinder 3*e* from the reinforcing ribs 11 is substantially uniform in the circumferential direction. Therefore, the circularity of the inner circumference of the support cylinder 3*e* is further improved.

(5) Two reinforcing ribs 11, the radially outward ends of which are connected to each other, and a section of the support cylinder 3*e* between the two reinforcing ribs 11 form a triangle Z having a vertex on the surrounding cylinder 12. Such triangles Z are arranged along the circumferential direction of the support cylinder 3*e* continuously. With this structure, the strength of the reinforcing ribs 11 and the support cylinder 3*e* is further improved.

(6) The gear housing 3 has the pair of reinforcing ribs 14, which extend toward the mounting portion 3*c*, and the pair of reinforcing ribs 15, which extend toward the mounting portion 3*d*. The reinforcing ribs 14, 15 extend from the circumferential wall of the surrounding cylinder 12. The reinforcing ribs 14, 15 improve the strength of the mounting portions 3*c*, 3*d* and permit the gear housing 3 to be secured to the support sections on the vehicle body or the like without a play.

The above embodiment may be modified as follows.

In the above embodiment, the reinforcing ribs 11 extend substantially along a tangent line to the support cylinder 3*e*. However, the angle of each reinforcing rib 11 with respect to the support cylinder 3*e* may be changed as required. Furthermore, the reinforcing ribs 11 need not be arranged to form the triangles Z. The number of the reinforcing ribs 11 may be other than twelve.

The surrounding cylinder 12 may be omitted. In this case, the shape and the position of the reinforcing ribs 14, 15 are preferably changed as required. The annular groove 13 corresponding to the surrounding cylinder 12 may be omitted. Furthermore, the reinforcing ribs 14, 15 may be omitted.

The gear housing 3 may be made of metal material other than aluminum alloy or of material other than metal such as resin material.

The present examples and embodiments are to be considered as illustrative and not restrictive and the invention is not to be limited to the details given herein, but may be modified within the scope and equivalence of the appended claims.

The invention claimed is:

1. A gear housing of a driving device equipped with a motor, the gear housing being secured to the motor and accommodating reduction gears, wherein rotation of the motor is reduced by the reduction gears and transmitted to an output shaft supported by the gear housing, the gear housing comprising:
a support cylinder, which supports the output shaft; and
a plurality of reinforcing ribs located about the support cylinder, each reinforcing rib extending from a circumferential wall of the support cylinder such that the angle between the reinforcing rib and a normal line that intersects the circumferential wall of the support cylinder form a predetermined angle, and each reinforcing rib is connected to the adjacent reinforcing rib at the circumferential wall of the support cylinder.

2. The gear housing according to claim 1, wherein each reinforcing rib extends substantially along a tangent line to the support cylinder.

3. The gear housing according to claim 1, wherein the reinforcing ribs are arranged to repeat a constant pattern along the circumferential direction of the support cylinder.

4. The gear housing according to claim 1, further comprising a surrounding cylinder, which surrounds the support cylinder.

5. The gear housing according to claim 4, wherein each reinforcing rib extends between the support cylinder and the surrounding cylinder, and each reinforcing rib has a radially inward end connected to the support cylinder and a radially outward end connected to the surrounding cylinder.

6. The gear housing according to claim 5, wherein the gear housing has a first surface from which the surrounding cylinder extend and a second surface opposite to the first surface, an annular groove is formed on a portion of the second surface corresponding to the surrounding cylinder.

7. The gear housing according to claim 5, wherein the radially inward end of each reinforcing rib is connected to the adjacent reinforcing rib and the radially outward end of the reinforcing rib is connected to another adjacent reinforcing rib.

8. The gear housing according to claim 7, wherein the two reinforcing ribs, the radially outward ends of which are connected to each other, and a section of the support cylinder between the two reinforcing ribs form a triangle having a vertex on the surrounding cylinder, the reinforcing ribs are arranged such that a plurality of triangles are continuously arranged in the circumferential direction of the support cylinder.

9. The gear housing according to claim 8, wherein the triangles are arranged to be symmetric with respect to the center of the support cylinder.

10. The gear housing according to claim 8, wherein the triangles are arranged about the support cylinder at equal angular intervals.

11. A gear housing of a driving device equipped with a motor, the gear housing being secured to the motor and accommodating reduction gears, wherein rotation of the motor is reduced by the reduction gears and transmitted to an output shaft supported by the gear housing, the gear housing comprising:
a support cylinder, which extends from an outer surface of the gear housing to support the output shaft;
a surrounding cylinder, which extends from the outer surface of the gear housing to surround the support cylinder; and
a plurality of reinforcing ribs located between the support cylinder and the surrounding cylinder, each reinforcing rib extending from a circumferential wall of the support cylinder such that the angle between the reinforcing rib and a normal line that intersects the circumferential wall of the support cylinder form a predetermined angle, and each reinforcing rib has a radially inward end connected to the support cylinder and a radially outward end connected to the surrounding cylinder.

12. The gear housing according to claim 11, wherein each reinforcing rib extends substantially along a tangent line to the support cylinder.

13. The gear housing according to claim 11, wherein the radially inward end of each reinforcing rib is connected to the adjacent reinforcing rib and the radially outward end of the reinforcing rib is connected to another adjacent reinforcing rib.

14. A driving device comprising:
   a motor;
   a gear housing secured to the motor;
   a plurality of reduction gears accommodated in the gear housing;
   an output shaft supported by the gear housing, wherein rotation of the motor is reduced by the reduction gears before being transmitted to the output shaft;
   a support cylinder, which extends from an outer surface of the gear housing to support the output shaft; and
   a plurality of reinforcing ribs, which extend from the outer surface of the gear housing about the support cylinder, each reinforcing rib extending from a circumferential wall of the support cylinder such that the angle between the reinforcing rib and a normal line that intersects the circumferential wall of the support cylinder form a predetermined angle, and each reinforcing rib is connected to the adjacent reinforcing rib at the circumferential wall of the support cylinder.

* * * * *